United States Patent [19]

Fort

[11] Patent Number: 4,915,355
[45] Date of Patent: Apr. 10, 1990

[54] SEAL

[75] Inventor: Edward S. Fort, Chitheroe, England

[73] Assignee: Fort Vale Engineering Limited, Lancashire, United Kingdom

[21] Appl. No.: 281,996

[22] Filed: Dec. 9, 1988

Related U.S. Application Data

[63] Continuation of Ser. No. 4,886, Jan. 20, 1987, abandoned.

[30] Foreign Application Priority Data

Jan. 23, 1986 [GB] United Kingdom ............... 8601640

[51] Int. Cl.⁴ .................... F16J 15/16; F16K 25/00
[52] U.S. Cl. .................................. 251/357; 251/356; 277/182; 277/198; 277/206 R; 277/229; 277/235 R
[58] Field of Search ............... 277/206 R, 227, 228, 277/229, 235 R, 235 B, 180, 181, 182, 184, 191, 198; 285/917; 251/332, 900, 321, 322, 323, 328, 334, 364, 356, 357; 137/542, 540, 535, 537

[56] References Cited

U.S. PATENT DOCUMENTS

| | | | |
|---|---|---|---|
| 736,303 | 8/1903 | Schultz | 277/191 |
| 857,134 | 6/1907 | Wilcox | 277/235 R X |
| 1,467,113 | 9/1923 | Meyers | 277/191 |
| 1,904,250 | 4/1933 | Purvis | 277/206 R X |
| 2,050,137 | 8/1936 | Walsh | 285/917 X |
| 2,767,768 | 10/1956 | Jelinek | 277/228 X |
| 2,859,061 | 11/1958 | Reid | 277/228 |
| 2,894,718 | 7/1959 | Englert | 251/332 X |
| 2,914,212 | 11/1959 | Fino | 277/228 X |
| 2,985,424 | 5/1961 | Anderson et al. | 251/357 X |
| 3,009,722 | 11/1961 | Augustin | 277/235 R X |
| 3,070,120 | 12/1962 | Wendt | 251/332 X |
| 3,167,324 | 1/1965 | Kratochvil | 277/235 B |
| 3,248,056 | 4/1966 | Obermaier | 251/332 X |
| 3,473,813 | 10/1969 | Meyers et al. | 277/235 B |
| 3,521,892 | 7/1970 | Sheesley et al. | 285/336 X |
| 3,532,349 | 10/1970 | Czernik | 277/206 R |
| 3,572,735 | 3/1971 | Dryer | 251/332 X |
| 3,722,898 | 3/1973 | von Benningsen | 277/206 |
| 3,905,577 | 9/1975 | Karpenko | 251/357 |
| 3,942,807 | 3/1976 | Dinger | 277/180 |
| 4,154,426 | 5/1979 | Santy et al. | 251/332 X |
| 4,155,571 | 5/1979 | Gastineau | 277/180 X |
| 4,188,037 | 2/1980 | Abbes et al. | 277/180 X |
| 4,369,980 | 1/1983 | Balklin | 277/235 B |
| 4,418,924 | 12/1983 | Mack | 251/900 X |

FOREIGN PATENT DOCUMENTS

| | | | |
|---|---|---|---|
| 283750 | 4/1915 | Fed. Rep. of Germany | 285/917 |
| 135278 | 4/1952 | Sweden | 251/322 |
| 20542 | of 1894 | United Kingdom | 277/228 |

Primary Examiner—ALlan N. Shoap
Attorney, Agent, or Firm—John S. Hale

[57] ABSTRACT

A seal, especially for a valve, comprises a substantially rigid support member 10, an abutment envelope 22 made from polytetrafluoroethylene (PTFE) defining a volume between it and the support member, and a resiliently deformable, compressed, rubber sealing member 18 positioned in the volume.

The PTFE envelope 22 is relatively chemically inert and allows the seal to be used in chemically harsh environments, the rubber sealing member 18 provides the necessary resilience and the rigid support member produces positive sealing.

In a preferred embodiment, the sealing member 18, the abutment envelope 22 and the support member 10 are annular.

8 Claims, 1 Drawing Sheet

U.S. Patent    Apr. 10, 1990    4,915,355
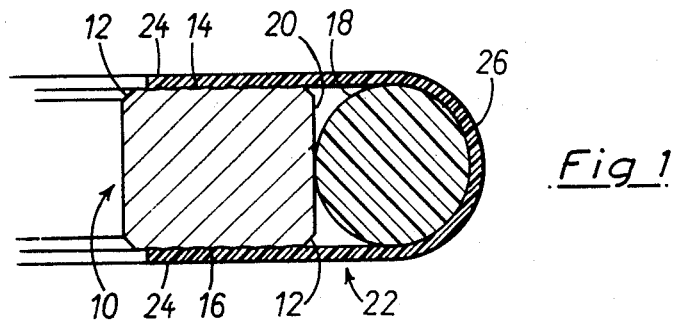
Fig_1
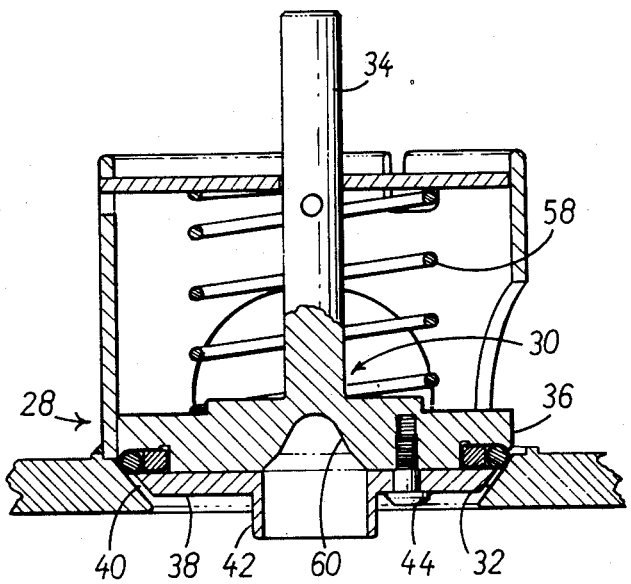
Fig_2
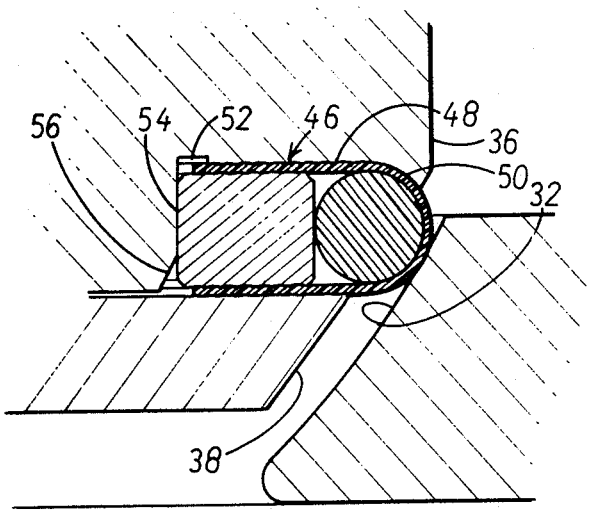
Fig_3

SEAL

This is a continuation of application Ser. No. 004,886, filed Jan. 20, 1987, now abandoned.

FIELD OF THE INVENTION

The present invention relates to a seal, and in particular, but not exclusively, to a valve seal or a piston seal.

DESCRIPTION OF PRIOR ART

It is often necessary to provide a seal between two relatively movable parts, in order to prevent the undesired flow of fluid or even of particulate solids. Seals are particularly necessary in valves, where a seal is responsible for securely shutting off the valve at the desired time. Usually, a valve seal is in the form of a rubber O-ring which is seated in a groove in a movable valve member and which abuts a valve seat when the valve is shut.

Although this arrangement is suitable in many applications, the rubber O-ring is likely to perish if particularly reactive or abrasive substances are flowing through the valve, and if a high flow rate is used, the O-ring can become displaced from its groove. In either case, sealing no longer occurs, and unwanted material may be discharged from the valve.

Thus, it is a requirement that a seal should be chemically relatively inert, should be securely seated to prevent it from becoming dislodged, yet should still have sufficient resiliency to provide a good sealing action.

A currently-used seal which seeks to overcome these problems consists of an O-ring with a rubber core and a polytetrafluoroethylene (PTFE) outer coating. This provides a good seal due to the resilience of the rubber and is chemically relatively inert due to the PTFE coating. However, the seals are very much more expensive than conventional rubber O-rings.

Another seal currently in use comprises two compressed asbestos fiber (CAF) washers, one on top of the other, which are held in an annular, square U-section, PTFE envelope, open radially outwardly, with a second annular, rounded U-section PTFE envelope, open radially inwardly, positioned over the first PTFE envelope. However, this arrangement leaves a considerable quantity of air between the second envelope and the CAF washers, which produces a lack of resilience. Moreover, the CAF washers are compressible to a degree, which results in less positive sealing of the seal against its valve seat. The seal is difficult to construct accurately, with resultant misalignment and poor performance. Moreover, the twin PTFE envelopes are difficult and expensive to assemble, and when worn out, the whole seal assembly must be discarded.

A similar seal to the above comprises a flat rubber annulus with a rounded outer edge over which rounded outer edge, and partially over the flat portion of the annulus, a close-fitting PTFE envelope is fitted. A second PTFE envelope extends partially over the flat portions of the first envelope and encloses the radially inner edge of the rubber annulus. Despite having rubber in its construction, this type of seal lacks the expected resilience, since the rubber fills substantially the whole of the space defined by the two PTFE envelopes and there is no room into which the rubber may deform. Although the resilience is less than expected, the rubber is still compressible to a degree, resulting in less positive sealing. As in the previous example of the prior art, there are problems with the assembly of the seal and with the fact that the whole seal must be dispensed with when worn.

OBJECT OF THE INVENTION

The present invention seeks to overcome or at least minimise the problems associated with the prior art.

SUMMARY OF THE INVENTION

In accordance with a first aspect of the present invention, there is provided a seal arrangement comprising: a resiliently deformable sealing member; a separately formed, substantially rigid support member having a first face in abutment with said resiliently deformable sealing member; and a separately formed protective envelope comprising a fold of flexible material in the form of two opposed flaps which are contiguous with an arcuate linking portion;

said opposed flaps of said envelope helping secure to respective second and third faces of said substantially rigid support member, said protective envelope enclosing said resiliently deformable sealing member, and the inner surface of said arcuate portion of said fold of said protective envelope abutting said resiliently deformable member which is thereby held in abutment with said first face of said substantially rigid support member.

In a preferred embodiment, the cross-sectional diameter of the underformed sealing member is less than the width of the volume defined between the envelope and the support member, such that the sealing member is compressed when fitted into the volume.

In a preferred embodiment, the support member comprises an annulus having two substantially parallel faces and the abutment envelope is annular, comprises two opposed faces, each face abutting one of the faces of the support member, and has a sealing portion interconnecting the two opposed faces. Preferably, the sealing portion connecting the two opposed faces is rounded, and preferably, one or both of the substantially parallel faces of the support member is serrated.

The sealing portion of the abutment member may be positioned radially inwardly or radially outwardly of the support member.

In accordance with a second aspect of the present invention, there is provided a valve comprising a seal in accordance with the present invention.

Preferably, the seal is held between two releasably securable portions of the valve, and preferably the parts of the valve portions abutting the seal are serrated.

By way of example only, a specific embodiment of the present invention will now be described, with reference to the accompanying drawings.

BRIEF DESCRIPTION OF THE DRAWINGS

FIG. 1 is a cross-sectional side elevation of a portion of an embodiment of valve seal according to the present invention.

FIG. 2 is a cross-sectional side elevation of a valve, with the valve seal of FIG. 1 fitted thereto; and FIG. 3 is a detail view of a portion of the valve shown in FIG. 2.

DESCRIPTION OF THE ILLUSTRATED EMBODIMENT

Referring firstly to FIG. 1, the embodiment of valve seal according to the present invention comprises an annular, stainless steel clamping ring 10, generally rectangular in cross-section, but having chamfered edges 12, and two serrated opposite faces 14,16 (serrated to B.S. 1560 Part 2). A rubber O-ring 18 is positioned on the radially outermost face 20 of the clamping ring 10 and is held in place by means of a polytetrafluoroethylene (PTFE) envelope 22. The PTFE envelope comprises two flat, substantially parallel portions 24 which are interconnected by a retaining portion 26 which is semi-circular in cross-section. It will be appreciated that the valve seal is annular and that only a cross-section of one portion of the seal is illustrated in FIG. 1.

In use, the envelope is fitted manually over the O-ring 18 and the clamping ring 10, and secures the O-ring in position adjacent the radially outermost face 20 of the clamping ring. It should ben noted that the distance between the internal faces of the portions 24 of the PTFE envelope, and the distance between the face 20 of the clamping ring and the radially outermost point on the inner surface of retaining portion 26 are both five per cent smaller than the cross-sectional diameter of the O-ring, so that when in position the O-ring is compressed between the envelope 22 and the clamping ring 10.

It will also be seen from FIG. 1 that the inner faces of the portions 24 assume the shape of the serrated faces 14,16 of the clamping ring. This helps to secure the envelope on the clamping ring and also provides an excellent seal between the clamping ring and the envelope.

Referring now to FIGS. 2 and 3, the valve seal is shown in use on a valve 28, which valve comprises a movable stainless steel valve member 30 which is movable into and out of sealing engagement with a frusto-conical stainless steel valve seat 32. The movable valve member 30 comprises a cylindrical stem 34 and a disc-shaped valve head 36, and a removable annular securing element 38 comprising a disc portion with chamfered edges 40 and an annular axially central flange 42. The valve member 30 and the securing element 38 are releasably securable my means of three threaded bolts 44, only one of which is visible in FIG. 2.

Referring to FIG. 3, the valve head 36 is provided with a circumferential annular groove 46 comprising a substantially flat portion 48 which is also serrated (to B.S. 1560 Part 2), an arcuate circumferential portion 50 shaped to receive part of the retaining portion 26 and an inner, arcuate, recessed portion 52. Furthermore, the upper edge defining the face 54 of the groove is chamfered to provide a frusto-conical surface 56. In use, the valve seal is fitted into the groove 46 and is held therein by positioning the securing element 38 and securing the securing element to the valve member 30 by means of the bolts 44. In this way, the valve seal is held firmly in place. It will also be seen from FIG. 3 that the portion of the securing element 38 which abuts the valve seal in use is serrated (to B.S. 1560 Part 2) which, as before, helps to provide an excellent seal between the valve member and the seal itself, and helps to secure the valve seal in position.

The valve is biassed shut by means of a compression spring 58 acting on the valve head 36, and may be opened by movement of an actuating finger (not shown) which is seated in a recess 60 in the face of the valve head 36 and which may be moved by a lever arrangement (not shown). The valve and its operation are well known and will not be further described.

When the valve is closed, the rigid stainless steel clamping ring 10 gives a positive clamped position, allowing tight tolerances. Moreover, the serrated surfaces 14,16,48 against which the PTFE envelope abuts helps to provide an extremely good sealing action.

There may be many variations to the present invention. For example, it will be appreciated by a person skilled in the art that the seal may be mounted in the valve seat 32 instead of in the movable valve member 30, in which case the seal would be constructed "inside out", that is with the retaining portion 26 radially innermost, the O-ring 18 radially outward of the portion 26 and the stainless steel clamping member 10 radially outermost.

The present invention may also be used in a butterfly valve or in any poppet type valve. However, the invention is not restricted to seals for valves. In particular, a seal according to the present invention may be used to seal a piston axially movable in a cylinder bore. The seal may be provided either on the piston, using a seal as described in the illustrated embodiment, or may be provided in the cylinder wall, using a seal as described in the foregoing paragraph.

We claim:

1. A seal arrangement comprising:
   a resiliently deformable sealing member;
   a separately formed, substantially undeformable support member having a plurality of faces, one of said faces being in abutment with said resiliently deformable member; and
   a separately formed, protective envelope comprising a fold of flexible material having two opposed flaps joined by, and contiguous with, an arcuate linking portion;
   said opposed flaps of said envelope being releasably engageable with respective second and third faces of said substantially undeformable support member, thereby defining between said support member and said envelope a void of greater cross-sectional area than said resiliently formable sealing member and in which void said resiliently deformable sealing member, in use, is located, said arcuate portion of said protective envelope abutting said resiliently deformable member which is thereby held in abutment with said first face of said substantially undeformable support member.

2. A seal arrangement according to claim 1, wherein the distance between said arcuate portion of said protective envelope and said face of said substantially rigid support member is less than the width of said resiliently deformable sealing member before said sealing member is arranged within the envelope.

3. A seal arrangement according to claim 1 wherein the minimum distance between said opposed flaps of said protective envelope is less than the depth of said resiliently deformable member before said sealing member is arranged within the envelope.

4. A seal arrangement according to claim 1, wherein said substantially rigid support member, said protective envelope and said resiliently deformable sealing member are annular.

5. A seal arrangement according to claim 1, wherein the plane of said face of said substantially rigid support member abutting said resiliently deformable sealing member is perpendicular to the planes of said second and third faces of said substantially rigid support member.

6. A seal arrangement according to claim 1, wherein said second and third faces of said substantially rigid support member are serrated.

7. A valve closure member consisting:

an annular recess defined by said valve closure member, said recess having a radially extending annular clamping face and a circular location face perpendicular to said clamping face;

a clamping member releasably securable to said valve closure member with a clamping face parallel to the said clamping face of said annular recess of said valve closure member;

an annular seal arrangement for sealing abutment with an annular valve seat mounted in said annular recess;

said annular seal arrangement comprising a resiliently deformable sealing member;

a separately formed, multifaced substantially undeformable support member formed with a first locating face in abutment with said resiliently deformable sealing member, a second locking face positioned parallel to said first locating face in abutment with said circular location face of said annular recess, and first and second annular clamping faces perpendicular to said first and second locating faces and parallel to the plane of said clamping face of said annular recess;

a separately formed, protective envelope comprising a fold of flexible material in the form of two opposed flaps contiguous with an arcuate linking portion;

said opposed flaps of said envelope being releasably engageable with said clamping face of said annular recess and said first clamping face of said annular recess and said first clamping face of said substantially rigid support member, and between said first clamping face of said clamping member and said second clamping face of said substantially rigid support member respectively, thereby defining between said support member and said envelope a void of greater cross-sectional area than said resiliently deformable sealing member and in which void said resiliently deformable sealing member, in use, is located, said arcuate portion of said protective envelope abutting said resiliently deformable member which is thereby held in abutment with said first locating face of said substantially undeformable support member.

8. A valve closure member according to claim 7, wherein the clamping faces of said annular recess, said clamping member and said substantially rigid support member are serrated.

* * * * *